July 6, 1954 J. W. LAWSON 2,682,783

SWITCH

Filed Feb. 4, 1949 3 Sheets-Sheet 1

INVENTOR.
JOHN W. LAWSON
BY
Spencer, Hardman & Fehr
HIS ATTORNEYS

INVENTOR.
JOHN W. LAWSON
BY
Spencer, Hardman & Fehr
HIS ATTORNEYS

July 6, 1954 J. W. LAWSON 2,682,783

SWITCH

Filed Feb. 4, 1949 3 Sheets-Sheet 3

INVENTOR.
JOHN W. LAWSON
BY
Spencer, Hardman & Fehr
HIS ATTORNEYS

Patented July 6, 1954

2,682,783

UNITED STATES PATENT OFFICE 2,682,783

SWITCH

John W. Lawson, Crowley, La., assignor to General Motors Corporation, Detroit, Mich., a corporation of Delaware Application February 4, 1949, Serial No. 74,577

2 Claims. (Cl. 74—503)

This invention relates to electrical switches and more particularly to manually operable switches.

The manually operable electrical switches usually employed for controlling electrical circuits installed on automotive vehicles have been generally of a number of different designs. For example, automotive vehicles, beside being supplied with a lighting switch, are being supplied in rapid increasing number with accessory devices some of which are electrically operated. Among such devices are heaters, defrosting devices, and fog lights. Each of these devices is normally controlled by a separate switch. It has been the practice heretofore to provide a different design for each switch. Such a practice has resulted in the necessity of manufacturing different switch housing and different switch parts assembled together to form different kinds of switches. Not only this, each switch has a different kind of contact arrangement and a special mounting for installing same in position on the vehicle. By such practices there is not only a lack of economy in the manufacture of such a great number of different parts for the different switches but also in the installation of each switch on the vehicle since different kinds of mountings are required for the different kinds of switches.

An object of the present invention is to provide uniformity in switch mountings for the different switches to be mounted upon the vehicle.

Another object of the invention is to provide a standardization of the operating parts of the switches so that most of the parts can be utilized by switches which control circuits of widely different character.

Another object of the invention is to provide switch apparatus which may be easily assembled together in different combinations to meet the requirements of particular circuit arrangements.

Another object of the invention is to provide switches in which the contact arrangements may be altered once the switch housing has been mounted on the vehicle.

Further objects and advantages of the present invention will be apparent from the following description reference being had to the accompanying drawings wherein a preferred embodiment of the present invention is clearly shown.

Figure 18:
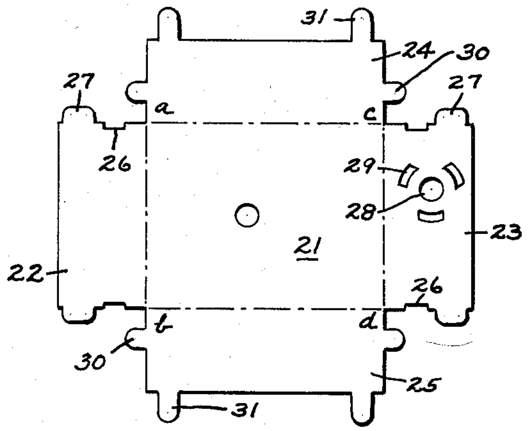
Fig. 18 is a development of a sheet metal stamping in an initial stage of its construction for forming the switch case.

Referring to the drawings 20 designates a switch casing. In making up the switch casing strip sheet metal is used and is formed in any suitable way, as by punch-press operations. The first step in forming the case 20 is to punch out a sheet metal blank shown in Fig. 18. The blank comprises a main portion or bottom wall 21 which is defined by bending lines *a*—*b*, *c*—*d*, *a*—*c*, and *b*—*d*, a pair of extensions or end walls 22 and 23 located adjacent at opposite ends of the main portion 21 and a pair of extensions or side walls 24 and 25 located at opposite sides of the main portion. The end walls 22 and 23 are provided with notches 26 and tongues 27. The end wall 23 is also provided with an aperture 28 and a series of elongated openings 29 arranged in spaced relation to each other and about the aperture 28. The side wall portions 24 and 25 are provided with tabs 30 and ears 31.

Figure 19:
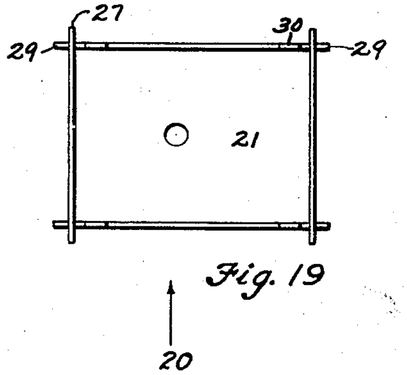
Fig. 19 is a plan view of the switch case after stamping shown in Fig. 18 is bent into the desired formation.
Figure 20:
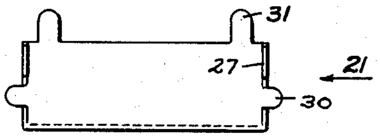
Fig. 20 is a side view of the casing shown in Fig. 19.
Figure 21:
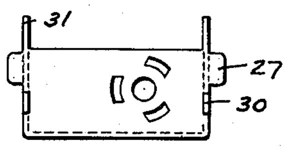
Fig. 21 is an end view of the casing looking in the direction of arrow 21.

The end walls 22 and 23 are bent along the line *a—b* and *c—d* respectively and the side walls 24 and 25 are bent along the lines of *a—c* and *b—d* respectively at an angle of 90° with respect to the plane of the bottom wall 21. When the blank is bent into rectangular formation as shown in Fig. 19, the tabs 30 on the side walls 24 and 25 will fit into respective notches 26 in the end walls 22 and 23 and the tongues 27 will extend beyond the side walls. The tongues 27 are bent toward each other against the end walls and the tongues 29 are bent toward each other against the side walls to hold the walls together and form in this instance the rectangular switch casing 20 enclosing a movable switch mechanism 33 which will be described hereinafter.

As mentioned heretofore, the end wall 23 is provided with the aperture 28 and openings 29. The openings 29 receive tongues 35 at one end of a hollow member or sleeve 36 which is assembled to the wall 23 by bending or upsetting the tongues against the inner surface of the wall 23.

The sleeve 36, in this instance, is counterbored to provide a socket 37 and a bore 38 which receives and guides a reciprocable rod 39. The counterbore forms a shoulder or stop 40 for a C-shaped washer 41 which fits into an annular groove 42 formed in the rod 39. The washer 41 is urged against the shoulder 40 by a compression spring 43 around the rod and interposed between the wall 23 and washer 41. It is to be understood that the spring 43, rod 39, and the washer 41 are assembled with the sleeve 36 before the latter is fixed to the wall 23. When the sleeve 36 is attached to the wall 23 the inner end of the rod extends through the opening 28 and into the casing. The inner end of the rod is provided with a pair of inwardly extending notches 44 whereby to provide a reduced or neck portion.

Figure 10:
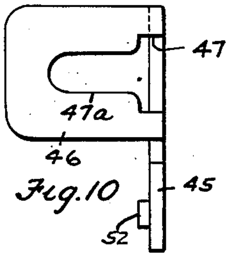
Fig. 10 is an end view of the movable plate shown in Fig. 9.
Figure 11:
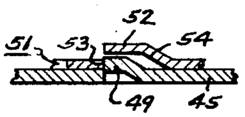
Fig. 11 is a fragmentary sectional view showing the cooperative relation between operating member 45 and ratchet 51.
Figure 12:
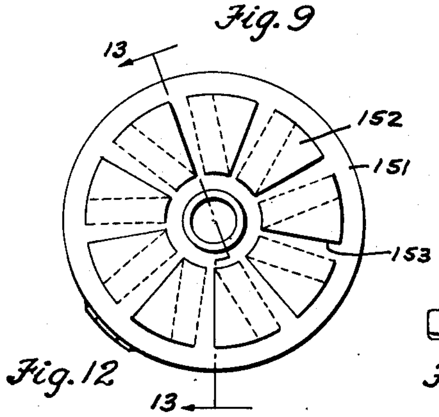
Fig. 12 is a plan view of the driving wheel shown in Fig. 8.
Figure 13:
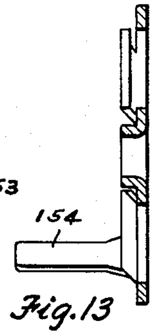
Fig. 13 is a sectional view taken on line 13—13 of Fig. 12.

The switch mechanism 33 includes a metal side plate 45 fitted for reciprocation in the interior of the casing 20 and is of sufficient width so as to be guided therein by the side walls 24 and 25. The plate 45 has an upturned arm 46. The plate has an opening 47 and the arm 46 has a reduced opening 47*a* which is in communication with the opening 47 as clearly shown in Fig. 10. The maximum width of slot 47 is slightly larger than the diameter of the rod 39 and the width of the slot 47*a* in arm 46 corresponds to the reduced portion or neck formed by the notches 44 on the inner end of the rod 39. The plate 45 is also provided with an elongated slot 48 and a projection 49 bent out of the plane of the plate. The slot 48 is adapted to receive a collar 50*a* of a pin 50 which is secured to the bottom of the switch case.

Figure 8:
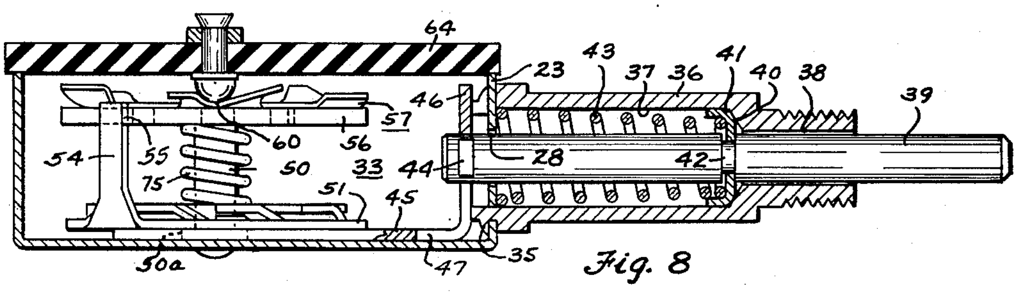
Fig. 8 is a sectional view taken substantially on line 8—8 of Fig. 1.
Figure 9:
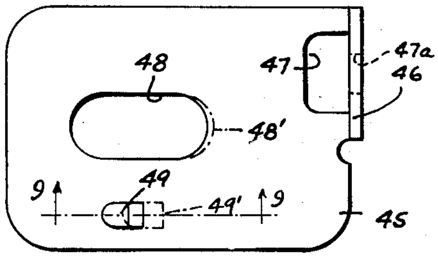
Fig. 9 is a plan view of movable plate shown in Fig. 8.

In view of the foregoing it should be apparent that the plate of the switch mechanism and the rod may be easily and quickly assembled together by inserting the guide plate 45 on the casing so that the end of the rod 39 will pass through the slot 47 and the reduced portion of the rod formed by the notches 44 will enter the slot portion 47*a* in the arm 46 as indicated in Fig. 8. In this position of the rod 39 and plate 45 the rod will be connected with the plate 45 to move it backward and forward along its path of movement within the case.

Figure 15:
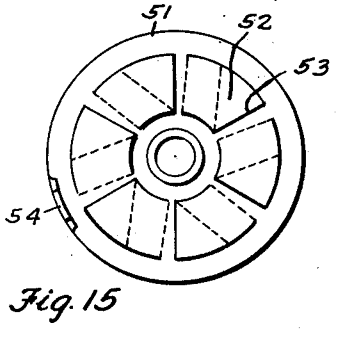
Fig. 15 is a modified form of a drive wheel.

The pin 50 rotatably supports a driving wheel 51 which is stamped from sheet metal. In this instance the wheel 51 see Fig. 15, is formed with six equally spaced fingers 52 struck out of the plane of the wheel to provide six straight edges 53 in the wheel. The fingers 52 are formed to provide cam portions 54. The free ends of the fingers are so spaced from the wheel proper so the projection 49 will fit loosely in the openings formed by the struck out portion to permit one side of the projection 49 to engage the straight edges 53 to drive the wheel in one direction of rotation.

Figure 16:
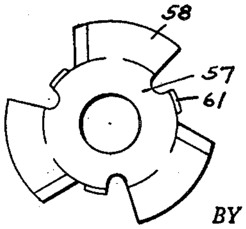
Fig. 16 is a modified form of a contact wheel.

The wheel 151 is provided with a driving arm 154 bent at an angle to the plane of the wheel and fits into a peripheral notch 55 provided by a movable or shiftable contact carrier 56 of nonconducting material which is rotatably mounted on the guide pin 50. The arm 154 drives the carrier 56 around the pin 50. The upper face of the carrier supports a bridging member 57 see Fig. 16 having their arms 58 extending radially from a central aperture portion. Each arm is provided with a detent 60. The contact is also provided with a plurality of tongues 61 each of which fit into a suitable opening provided by the carrier 56 so that contact will be anchored to and rotate with the carrier 56.

Figures 1, 2, 3, 4, 5, 6, 7:
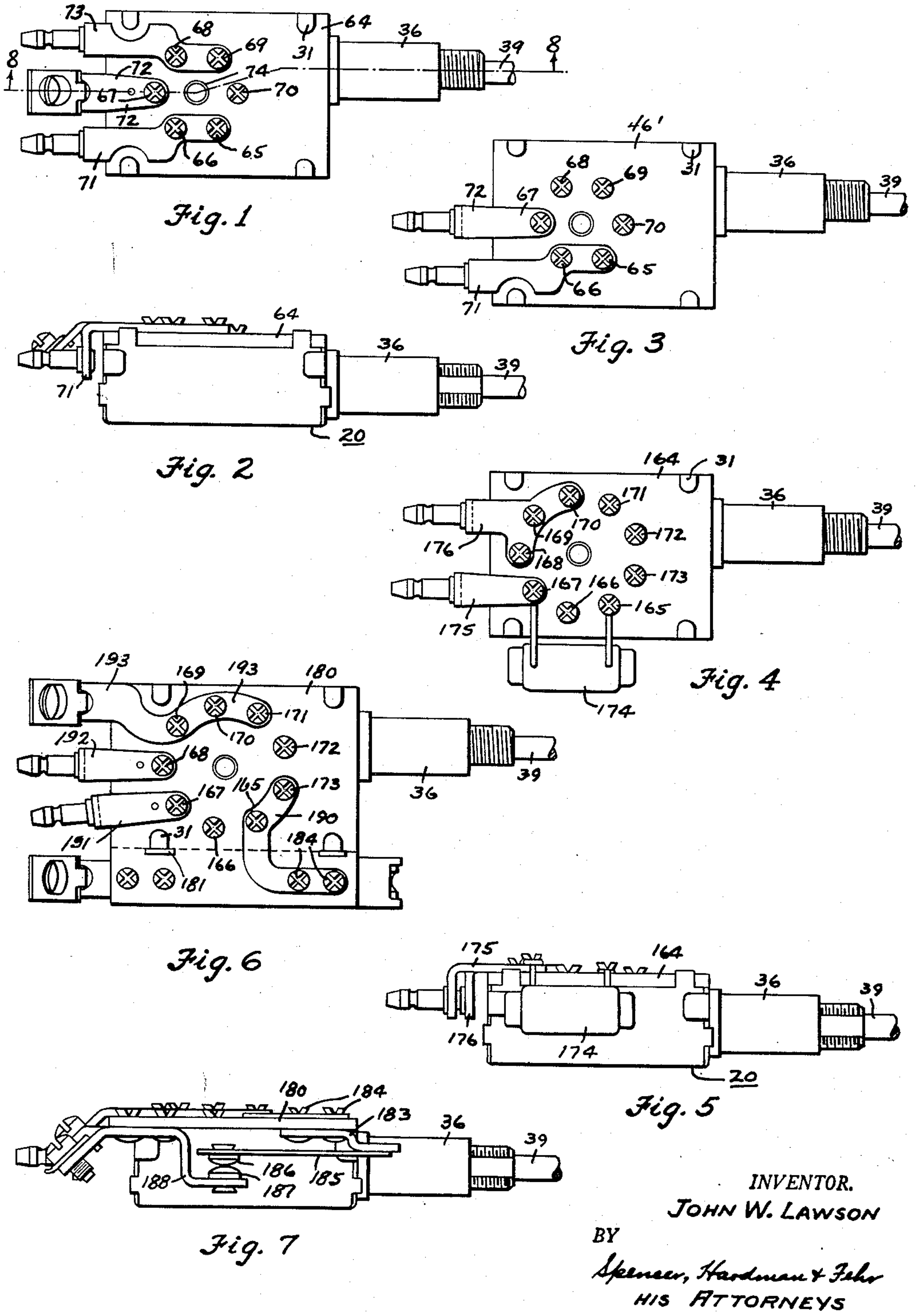
Fig. 1 is a bottom plan view of a switch embodying the present invention illustrating one type of contact arrangement.
Fig. 2 is a side view of the switch shown in Fig. 1.
Fig. 3 is a view similar to Fig. 1 modified to provide a different contact arrangement.
Fig. 4 shows the switch modified to provide a different contact arrangement.
Fig. 5 is a side view of the switch shown in Fig. 4.
Fig. 6 shows the switch modified to have still another contact arrangement.
Fig. 7 is a side view of the switch shown in Fig. 6.

The switch casing 20 is closed by a closure or block 64 of insulating material. In Fig. 1 the block carries five stationary contacts 65, 66, 67, 68 and 69 and a dummy rivet 70, each in the form of round headed rivets. Contacts 65 and 66 are connected with a terminal plate 71, contact 67 is connected with terminal plate 72, and contacts 68 and 69 are connected with terminal plate 73. The rounded heads of these rivets are adapted to fit in the detents 60 of the bridging member 57. The carrier 56 is provided with an opening 74 to receive a free end of pin 50. The closure 64 is secured to the casing 20 by the ears 30 provided by the side walls 24 and 25 of the casing. These ears are bent over the closure to hold the latter in position. Through the agency of a helical coil spring 75 about the pin 50 and disposed between the wheel 51 and the carrier 56, the wheel 51 is at all times pressed against the plate 45 to hold same against the bottom wall 21 of the casing, and at its upper end against the carrier 56 to urge the same upwardly to hold the bridging member 57 in engagement with three of the contacts. By this arrangement the arm 46 is latched or connected with the rod 39.

With the parts arranged as shown in Fig. 8, it is apparent that when the rod 39 is manually moved to the left the tongue 49 of plate 45 will engage one of the straight edges 53 in the wheel 51 to drive the latter in one direction causing the arm 154 to rotate the carrier and bridging member substantially 60° in the same direction to bridge certain contacts. Upon release of the rod 39 the rod under the influence of the spring 43 will return the rod 39 to its normal position shown in Fig. 8. When the slide plate 45 is being moved to the right the projection 49 will engage the cam portion 54 of finger 52 of the wheel to move the wheel upwardly against the influence of spring 75 and cause the detents 60 to engage firmly the rounded ends of the contacts which prevents the driving wheel, the bridging member, and the carrier from turning in the opposite direction and thus maintains the bridging member in position until the rod is again manually operated whereupon the driving wheel, carrier, and the bridging member will be rotated another 60°, connecting a different series of contacts.

The form of switch shown in Fig. 3 is closely similar to that shown in Fig. 1 and the operation and functions are therefore marked with the same reference characters. In this instance the closure 46 is provided with three live contact rivets 65, 66, 67 and three dimming contacts 68, 69 and 70. As shown the terminal plate 71 is connected with the contact rivets 65 and 66 and terminal plate 72 is connected with the contact 67. By this arrangement when the rod is actuated it operates to make and break a single circuit. For example when the switch is in its closed position the arms of the contact wheel will engage contact rivets 65, 67 and 69 and when actuated to an open position the arms will engage contacts 66, 68 and 70.

The switches illustrated in Figs. 4 to 7 inclusive use a switch casing and plunger which is similar in construction to the casing and plunger of the switches shown in Figs. 1 to 3 but the switches shown in Figs. 4 to 7 inclusive are provided with a greater number of contact rivets arranged in a circular path. Also the slide plate, driving wheel, contact carrier, and the bridging member are different. In the forms shown in Figs. 4 to 7, inclusive, the structure of like elements are marked with the same reference characters as in the earlier numbered figures except that they are primed or 100 is added.

In Fig. 5 the switch structure includes the slide plate 45, but the elongated opening is increased in length as indicated by dot and dash lines 48′ and the projection 49′ is stamped out at different locations in the slide plate as indicated by dot and dash lines 49′. In this instance a different driving wheel 151 is necessary for the switches shown in Figs. 4 to 7 inclusive, and the driving wheel is formed with nine fingers 52′ and nine straight edges 153′. The fingers are formed to provide a cam portion 54′. The free end of the fingers are spaced from the upper surface of the wheel to allow the projection 49′ to extend into the space below the fingers and engage one or the other of the straight edges 153′ to drive the wheel 151 in one direction of rotation.

Figure 14:
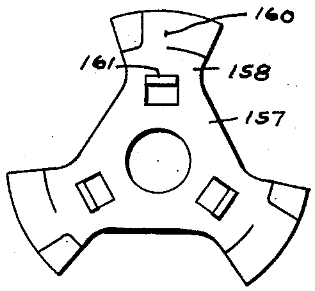
Fig. 14 is a plan view of a contact wheel shown in Fig. 8.
Figure 17:
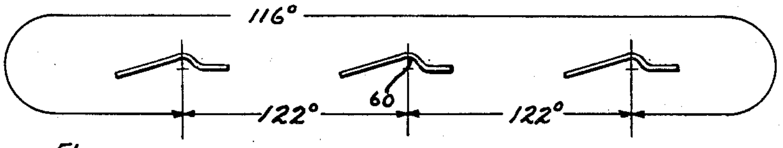
Fig. 17 is a diagrammatic view showing the spacing of the detents in the arms of the bridging member shown in Fig. 16.

The wheel 151 is provided with an arm 154 which fits into a notch provided on a suitable contact carrier not shown, but which is similar in construction as carrier 56 but larger in diameter. The face of the carrier supports a bridging member 157 see Fig. 14 having three arms 158 extending radially from a central portion, each arm has a detent 160. The bridging member has three tongues 161 which fit into suitable notches of the carrier to anchor the bridging member to the carrier in a manner similar to that set forth for bridging member 57.

The switch casing 20 in Fig. 6 is closed by a closure 164 of insulating material and supports nine contact rivets, 165 to 173 inclusive. Contact 165 is connected to one end of a resistance unit 174, the other end of the resistance unit is connected with contact 167 which in turn is connected with a terminal strap 175 having a plug that is adapted to fit into a suitable socket connected with a motor of a heater unit. The rivets 168, 169 and 170 are connected with a strap 176 having a plug which fits into a socket connected to a battery. The rivet terminals 171, 172, 173 and 166 in this instance are dummy terminals.

The normal open position of the switch shown in Fig. 4 is when the arms 158, of bridging member 157 are engaging the heads of terminal 169, 172 and 166. When the switch rod 39 is pushed inwardly the bridging member will move one step to bridge terminal rivet head 167, 170 and 173. In this position no current will pass through the resistance unit. When the rod is released to permit the rod to return to its normal position and then depressed the bridging member will then engage rivet heads 165, 168 and 171. This will cause current to pass through the resistance unit. The current flowing from strip 176 terminal 168 to the bridging member and then to terminal 165, resistance unit, terminal 167, strip 175 and thence to the motor of the heater unit.

In the form of switch shown in Figs. 6 and 7 all the movable switch elements used in the construction of the switch are substantially the same as shown in Fig. 4, but a different closure 180 is used. In this instance the switch is adapted to be used to control the lighting circuits of the vehicle. It will be noted that the closure 180 is wider than closure 164. The closure 180 has openings 181 through which the tangs 31 pass and then are bent over the closure to hold the closure to the case 20. The portion of the closure which overlies the casing 20 supports a thermal switch 182 which comprises a terminal plate 183 attached to the closure by rivets 184. A contact blade 185 has one end attached to the plate 183 while the free end carries a movable contact 186 which normally engages a relative stationary contact 187 fixed to a bracket 188 also attached to the closure. The bracket 188 is connected to a battery.

The closure 180 also supports a series of contact rivets 165 to 173 inclusive, arranged in a circular row. In this instance contact rivets 166 and 172 are dummy contacts. Contacts 165 and 173 (see Fig. 6) are conductively connected by a strap 190 to the plate 183 by the rivets 184. The terminal 167 is connected with a strap 191 (see Fig. 6) which leads to main head lights. Terminal rivet 168 is connected to a strap 192 (see Fig. 6) which is connected with the parking lights of the vehicle and contact rivets 169, 170 and 171 are connected with a strap 193 (see Fig. 6) connected with the tail lamps of the vehicle. The operation of the switch is identical to that disclosed for the other switch but when the rod is pushed inwardly the terminal rivets will be engaged in the following manner. In its normal or open position of the switch Fig. 6 the bridging member 157 will have its three radial arms engaging rivet contacts 172, 166 and 169. When the rod is pushed inwardly the slide plate 45 will rotate the driving wheel, carrier and bridging member 40° to bridge rivet terminals 165, 168, 171 causing both the "park" and tail lights to be connected with the battery. On the next movement of the rod inwardly the bridging member together with the driving wheel will be moved another 40° whereby rivet terminals 173, 167, 170 will be bridged and connected with the battery. The next movement of the rod will deenergize all light circuits causing main head lights to operate.

The thermal switch normally is closed and set to carry normal lamp load, and will open when subjected to overload, thus protecting the lamp wiring from overheating.

While the embodiment of the present invention as herein disclosed, constitutes a preferred form, it is to be understood that other forms might be adopted.

What is claimed is as follows:

1. In combination with a casing having an end wall provided with an opening, of a mounting sleeve adapted to be secured to the end wall in register with the opening; an abutment inside the sleeve a distance from the end wall; a rod having a groove adapted for reciprocating movement passing through the sleeve and extending into the casing through said opening in the end wall, said rod adapted to be removably interlocked with a movable member within the casing; a C-washer located within the confines of the sleeve and fitted in the groove; a conical spiral spring surrounding the rod, said spring having its larger convolution bearing against the end wall and having its smaller convolution bearing against the washer to urge normally the washer against the stop, and limit the movement of the rod in its outward direction; and flange means carried by the washer surrounding the smaller convolution of the spring to maintain the axis of the spring substantially coaxial with said rod.

2. The combination with a housing having a wall provided with an opening and a plurality of apertures surrounding said opening, of a one-piece hollow member having a plurality of lugs extending from one end and adapted to extend through the apertures and having an internal abutment adjacent the other end to form a stop; a reciprocating rod having a groove, said rod adapted to extend through the hollow member and the opening in the wall, said rod adapted to be detachably interlocked with a movable member within the housing, a washer received by the groove and located within the hollow member, said washer operating to retain the rod from displacement from the hollow member, resilient means surrounding the rod having one end bearing against the wall and having the other end bearing against the washer to urge normally the washer against the abutment; and means including portions of the lugs clinched over the wall to hold the hollow member in position.

References Cited in the file of this patent

UNITED STATES PATENTS

| Number | Name | Date |
|---|---|---|
| 1,475,111 | Gries et al. | Nov. 20, 1923 |
| 1,797,745 | Winning | Mar. 24, 1931 |
| 1,906,084 | Norviel | Apr. 25, 1933 |
| 2,070,717 | Edwards | Feb. 16, 1937 |
| 2,260.592 | Winning | Oct. 28, 1941 |
| 2,260,641 | Reid | Oct. 28, 1941 |
| 2,272,688 | Catron | Feb. 10, 1942 |
| 2,283,630 | Hill | May 19, 1942 |
| 2,292,736 | Betz | Aug. 11, 1942 |
| 2,419,072 | Hall | Apr. 15, 1947 |
| 2,512,788 | Brown et al. | June 22, 1950 |